United States Patent
Lee et al.

(10) Patent No.: US 9,461,344 B2
(45) Date of Patent: Oct. 4, 2016

(54) BATTERY PACK CONTAINER AND APPARATUS FOR COOLING POWER STORAGE BATTERY PACK USING THE SAME

(71) Applicant: LG CHEM, LTD., Seoul (KR)

(72) Inventors: Bum-Hyun Lee, Seoul (KR); Mi-Jung Park, Seoul (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/960,995

(22) Filed: Aug. 7, 2013

(65) Prior Publication Data

US 2013/0323551 A1   Dec. 5, 2013

Related U.S. Application Data

(63) Continuation of application No. PCT/KR2012/003177, filed on Apr. 25, 2012.

(30) Foreign Application Priority Data

Apr. 25, 2011 (KR) ........................ 10-2011-0038383

(51) Int. Cl.
*H01M 10/50* (2006.01)
*H01M 2/10* (2006.01)
(Continued)

(52) U.S. Cl.
CPC ....... *H01M 10/5004* (2013.01); *H01M 2/1077* (2013.01); *H01M 10/613* (2015.04);
(Continued)

(58) Field of Classification Search
USPC .................................................... 429/62, 120
See application file for complete search history.

(56) References Cited

U.S. PATENT DOCUMENTS 3,837,918 A * 9/1974 Nakabayashi .... H01M 10/3909
429/104
2003/0081381 A1   5/2003 Moizer
(Continued)

FOREIGN PATENT DOCUMENTS

| JP | 9-104241 A | 4/1997 |
| JP | 2010-123298 A | 6/2010 |
| JP | 2010-244802 A | 10/2010 |
| JP | 2010-272251 A | 12/2010 |
| KR | 10-2008-0027506 A | 3/2008 |

(Continued)

OTHER PUBLICATIONS

International search report issued in PCT/KR2012/003177 mailed Nov. 26, 2012.

*Primary Examiner* — Ula C Ruddock
*Assistant Examiner* — Osei Amponsah
(74) *Attorney, Agent, or Firm* — Birch, Stewart, Kolasch & Birch, LLP

(57) ABSTRACT

Disclosed is an apparatus for cooling a battery pack, having a stack having a plurality of battery pack containers in a multi-layered structure, the battery pack container having an inner space to receive a battery pack and includes a first and second side plate facing each other to form side walls of the inner space; two upper frames for respectively connecting the top corners of the first to the second side plate; and two lower frames for respectively connecting the bottom corners of the first to the second side plate, the two lower frames including a front lower frame, disposed forwardly within the container with an inflow hole for introducing cooling medium, and the two upper frames include a rear upper frame, disposed rearwardly within the container and having an outflow hole for discharging cooling medium after heat exchange occurs; a housing; a circulation driving module; and an exhaust duct.

6 Claims, 8 Drawing Sheets

(51) Int. Cl.
  *H01M 10/613* (2014.01)
  *H01M 10/625* (2014.01)
  *H01M 10/6563* (2014.01)
  *H01M 10/6556* (2014.01)
  *H01M 10/6557* (2014.01)
  *H01M 10/647* (2014.01)

(52) U.S. Cl.
  CPC ....... *H01M10/625* (2015.04); *H01M 10/6556* (2015.04); *H01M 10/6557* (2015.04); *H01M 10/6563* (2015.04); *H01M 10/647* (2015.04)

(56) References Cited

U.S. PATENT DOCUMENTS

| | | | |
|---|---|---|---|
| 2008/0247135 A1* | 10/2008 | Inoue et al. | 361/695 |
| 2010/0055547 A1 | 3/2010 | Nakamura | |
| 2010/0136420 A1* | 6/2010 | Shin et al. | 429/178 |
| 2010/0297486 A1 | 11/2010 | Fujii | |

FOREIGN PATENT DOCUMENTS

| | | | | |
|---|---|---|---|---|
| KR | 10-2009-0002428 | * | 1/2009 | ............ H01M 10/50 |
| KR | 10-2009-0002428 A | | 1/2009 | |

* cited by examiner

BATTERY PACK CONTAINER AND APPARATUS FOR COOLING POWER STORAGE BATTERY PACK USING THE SAME

CROSS-REFERENCE TO RELATED APPLICATION

The present application is a continuation of International Application No. PCT/KR2012/003177 filed on Apr. 25, 2012, which claims priority to Korean Patent Application No. 10-2011-0038383 filed in the Republic of Korea on Apr. 25, 2011, the disclosures of which are incorporated herein by reference.

TECHNICAL FIELD

The present invention relates to a battery pack container and an apparatus for cooling a battery pack using the same, and more particularly, to a battery pack container, which allows a plurality of battery packs to be easily stacked and allows a cooling medium to be effectively circulated, and an apparatus for cooling a power storage battery pack, which can effectively implement a cooling medium circulating structure including exhaust and inhalation, by connecting to a cooling medium circulating structure of the battery pack container.

BACKGROUND ART

A secondary battery has high applicability depending on the product group and excellent electrical characteristics such as high energy density, and thus is commonly used as an electric power source of electric vehicles (EV) or hybrid vehicles (HV) as well as mobile devices.

Such a secondary battery can be repetitively charged and discharged by an electrochemical reaction, so to not only significantly reduce the use of fossil fuels but also generate any by-products that come with energy consumption. Therefore, secondary batteries improve energy efficiency, are environmentally friendly, and are gaining attention as a new alternative energy source.

A battery pack, which is used in electric vehicles, conventionally includes an assembly, consisting of a plurality of unit cells, and a plurality of assemblies or battery modules. The cell includes a cathode current collector, a separator, an active material, an electrolyte solution, an aluminum thin film layer, etc., and has a structure capable of charging or discharging by an electrochemical reaction between components.

Meanwhile, an individual secondary battery is referred to as a cell, a group of secondary batteries is referred to as an assembly (i.e., battery module), and a group of assemblies is referred to as a battery pack. Unless otherwise mentioned herein, the term 'a secondary battery' which is used herein is defined not only as a cell, but also as a battery assembly or a battery pack, and the term 'a battery pack' which is used herein is defined as a group consisting of a plurality of secondary batteries.

Recently, with the increasing significance of global issues relating to the exhaustion of energy resources such as fossil fuels, environmental pollution, economically efficient energy use, and the like, a smart grid system has been actively studied to effectively overcome the inequality in power consumption and power production and solve the problems caused thereby, such as, power wastage when power is oversupplied and power overload when power supply is in shortage. The smart grid system flexibly controls the power supply using a variety of information and communication infrastructures.

In other words, the infrastructure of a smart grid system is configured to store surplus power when power consumption is low and supply the stored power with supply power to consumers when power consumption is high.

In this instance, the smart grid system needs a medium for storing power. As such a medium, a secondary battery or a battery pack is dominantly used.

Also, a power storage battery pack can be used in other various fields besides the smart grid system. For example, since an electric vehicle charging station which is designed to supply electric power to electric vehicles by charging requires a large amount of power to be stored, a power storage battery pack may also be used for the electric vehicle charging station.

The power storage battery pack is implemented as a large-capacity system by assembling a plurality of secondary batteries in various structures (e.g, a tower-shaped stack in which battery packs are vertically stacked), and the secondary batteries are repetitively charged and discharged by electrochemical reactions. This repeated charging or discharging inevitably generates heat in the secondary batteries, and the heat dramatically increases with increasing battery capacity.

However, such heat may cause potential injury or damage to a secondary battery allowing electrochemical reactions, resulting in deterioration in the performance of the battery, which may not ensure the life of the battery. Furthermore, heat is also known as a fatal factor exerting a bad influence on the safety of the battery, which may cause explosion and the like.

Accordingly, a secondary battery needs a cooling system to remove heat generated during operation. Particularly, in the case of a high-capacity high-integration power storage system, a cooling system is even more necessary to solve the heat generation problem.

However, a conventional system for cooling a power storage battery pack is obtained by simply combining a plurality of systems which cool an individual battery pack, and fails to optimize power storage battery packs accumulated in a large-scale.

In the case of the conventional system, since each battery pack in a tower-shaped stack needs to be independently operated by means of an individual cooling control method, there occurs an inefficiency in that a duplication of cooling systems occur. Furthermore, since a battery management system (BMS) for controlling an individual battery pack and logics for driving the BMS are required, it may cause a complexity in an air conditioning system which is significantly inefficient in terms of the management of the cooling system, including maintenance or repair.

Also, unlike a battery pack installed in vehicles, a conventional power storage battery pack and a cooling system thereof may occasionally be installed outside a facility which may incidentally damage the insulating property of the battery pack by water permeation.

DISCLOSURE

Technical Problem

The present invention is designed to solve the problems of the prior art, and therefore it is an object of the present invention to provide an apparatus for cooling a power storage battery pack, which has an enhanced structure allowing power storage battery packs configured in the form of a tower-shaped stack to establish a simple and efficient cooling system, and a battery pack container used therein.

Additional aspects and advantages will be apparent from the embodiments of the present invention. The aspects and advantages of the present invention may be realized by means of instrumentalities and combinations particularly pointed out in the appended claims.

Technical Solution

In order to achieve the above-mentioned objects, in accordance with one aspect of the present invention, there is provided a battery pack container having an inner space to receive a battery pack, the battery pack container including a first side plate and a second side plate facing each other to form both side walls of the inner space; two upper frames for respectively connecting the top corners of the first side plate to those of the second side plate; and two lower frames for respectively connecting the bottom corners of the first side plate to those of the second side plate, wherein the two lower frames include a front lower frame, disposed forwardly within the container and having an inflow hole for introducing a cooling medium; and the two upper frames include a rear upper frame, disposed rearwardly within the container and having an outflow hole for discharging the cooling medium after heat exchange occurs.

In addition, the present invention may further include a top plate which covers the two upper frames and the top portions of the first and second side plates.

Herein, the top plate may have an uneven structure at the bottom portion thereof, in which the uneven structure corresponds to an uneven structure of the top portion of the upper frames. Also, the top plate may have an uneven structure at the top portion thereof, in which the uneven structure corresponds to an uneven structure of the bottom portion of the lower frames. At this time, the uneven structure is preferably an insert-type coupling structure or a slide-type coupling structure.

Also, it is more preferred to form the rear upper frame in an arch shape.

Meanwhile, in order to achieve the objects described above, in accordance with another aspect of the present invention, there is provided an apparatus for cooling a power storage battery pack, including a stack having a plurality of battery pack containers in a multi-layered structure, wherein the battery pack container has an inner space to receive a battery pack and includes a first side plate and a second side plate facing each other to form both side walls of the inner space; two upper frames for respectively connecting the top corners of the first side plate to those of the second side plate; and two lower frames for respectively connecting the bottom corners of the first side plate to those of the second side plate, and the two lower frames including a front lower frame, disposed forwardly within the container and having an inflow hole for introducing a cooling medium, and the two upper frames including a rear upper frame, disposed rearwardly within the container and having an outflow hole for discharging the cooling medium after heat exchange occurs; a housing having an inlet for introducing the cooling medium at the front case thereof; a circulation driving module for providing a driving force to introduce or discharge the cooling medium; and an exhaust duct provided at the rear side of the stack, having an outlet for discharging the cooling medium after heat exchange occurs and allowing one end thereof to be connected to the circulation driving module.

In addition, the inlet of the front case may be provided at the place corresponding to the inflow hole formed at the front lower frame included in the battery pack container, and the inlet of the front case is preferably formed in a slit shape.

In order to implement a more preferable embodiment, protruding members may be further provided at the upper portion of the inlet, so that foreign substances are not introduced into the inlet.

Moreover, the outlet of the exhaust duct is preferably provided at the place corresponding to the outflow hole, formed at the rear upper frame included in the battery pack container.

Advantageous Effects

According to the present invention, since a battery pack container and an apparatus for cooling a power storage battery pack allow a plurality of power storage battery packs to have a suitable structure for an air conditioning system and to be easily layered in a stack, the battery packs may be easily extended.

Further, since a battery pack container has enhanced upper and lower structures, a path along which a cooling medium circulates may be optimized to cool a battery pack, and the load according to a stack of the battery packs is effectively dispersed. Also, the top and bottom battery pack containers are mutually coupled to each other in a structure capable of sealing a cooling medium, the introduction and discharging of a cooling medium may be effectively achieved.

Furthermore, in accordance with the present invention, regardless of the number of the battery packs, the cooling system of a power storage battery packs can be integrally controlled as a single device, so that an air conditioning system can be provided in a more effective and efficient infrastructure.

In addition, since the flow of a cooling medium such as air is effectively applied to a cooling system, the efficiency of the cooling system can be improved, and in particular, through a duct structure for integrally collecting the cooling medium discharged after cooling each battery pack, an air conditioning system in which a cooling medium is effectively introduced and discharged can be implemented.

Still furthermore, an inlet for introducing a cooling medium can have an enhanced structure to provide an apparatus which considers external circumstances in which a power storage battery pack is installed and minimizes the deterioration of battery performances, such as the destruction of insulating properties due to water permeation.

DESCRIPTION OF DRAWINGS

In order to explain the principle of the present invention, some accompanying drawings related to its preferred embodiments are below for the purpose of illustration and description, although they are not intended to be exhaustive. The drawing figures depict one or more exemplary embodiments in accord with the present concepts, by way of example only, not by way of limitations.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
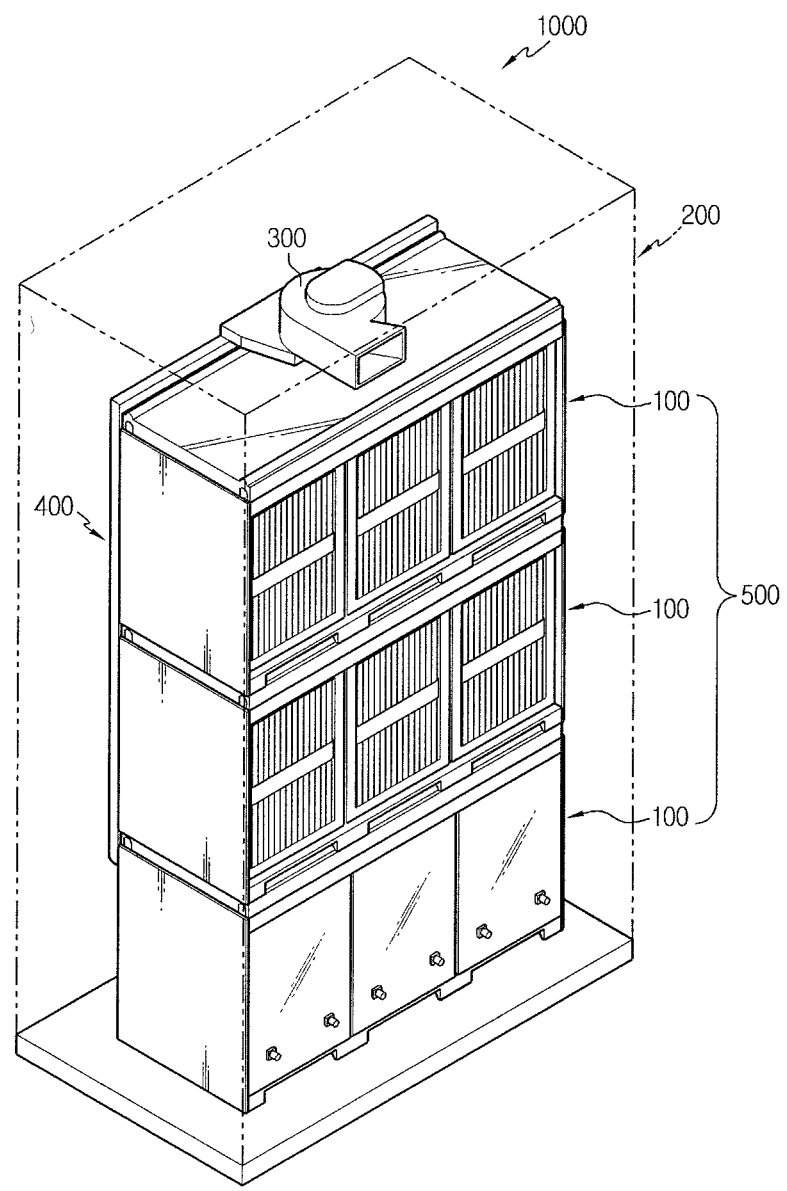
FIG. 1 is a perspective view showing an apparatus for cooling a power storage battery pack according to a preferred embodiment of the present invention.

FIG. 1 is a perspective view showing an apparatus for cooling a power storage battery pack 1000 (hereinafter, referred to as cooling apparatus) according to a preferred embodiment of the present invention. Regarding the cooling apparatus 1000 of the present invention, the general and overall information thereof will be explained with reference to FIG. 1, and the details thereof will be described later with reference to the corresponding drawings.

As shown in FIG. 1, the cooling apparatus 1000 of the present invention may include a housing 200, a circulation driving module 300, an exhaust duct 400, and a stack 500 formed by layering a plurality of battery pack containers 100 in which battery packs 10 are provided.

As mentioned above, the battery pack 10 which is used herein refers to a plurality of secondary electric cells or a group of assemblies in accordance with the embodiment of the present invention and may be a thing or an object installed and received in the battery pack container 100 of the present invention.

In accordance with the embodiments of the present invention, one or more battery packs 10 may be provided in the battery pack container 100 to be electrically coupled in series or in parallel to each other in various forms. Also, the battery packs 10 may be disposed to function as an independent power source.

The housing 200 may act as an external case covering the configuration of the present invention for the purpose of protection, and may also have a hole for discharging a cooling medium which undergoes heat exchange to be exhausted from the circulation driving module 300, described later.

The circulation driving module 300 provides a driving force by rotationally driving a pan to introduce a cooling medium (e.g., air, etc.) and exhaust the cooling medium, which is heat-exchanged, to the outside. The circulation driving module 300 may be provided in various manners known to those of ordinary skill in the art, including a manner which controls the rotation driving force (RPM) of a pan.

The exhaust duct 400 of the present invention is provided at one surface of the stack 500 formed by layering a plurality of battery pack containers 100. Also, the exhaust duct 400 is configured to form a common exhaust path for discharging a cooling medium which undergoes heat exchange to be exhausted through one or more outlets of each battery pack container 100 by the driving force of the circulation driving module 300.

Referring to the accompanying drawings including FIG. 1, the stack 500 of the battery pack containers 100 is illustrated as a stack with three layers in a vertical direction, but is merely just an example. The stack 500 may easily adopt various types of stack structures according to the embodiment of the present invention, based on the coupling structures of the upper and lower battery pack containers 100, described later.

Hereinafter, the battery pack container 100 and other components included in the cooling apparatus 1000 will be explained with reference to the accompanying drawings.

Figure 2:
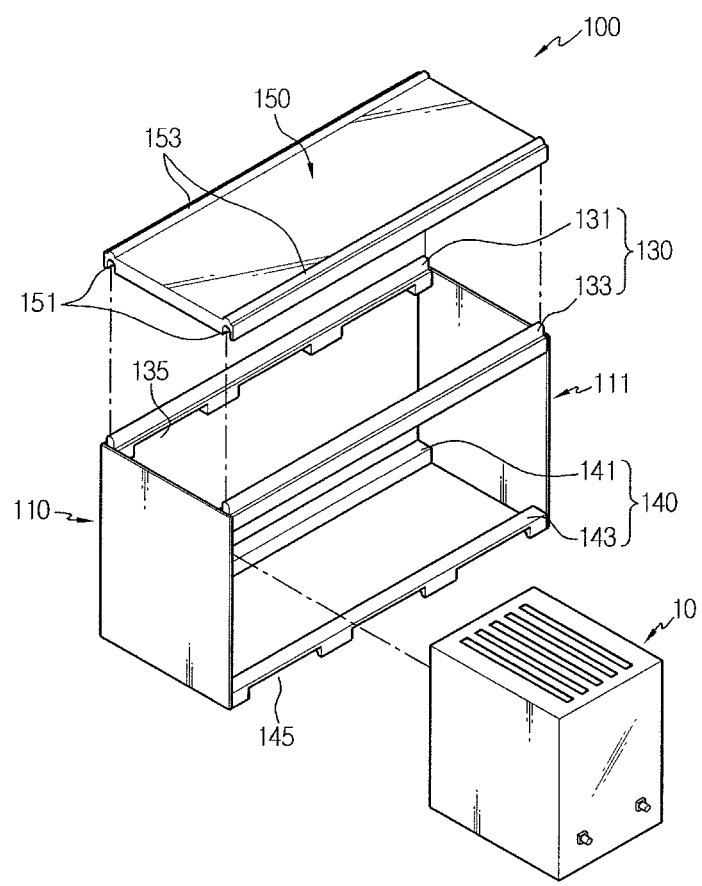
FIG. 2 is an exploded perspective view showing a structure and mechanical coupling relationships of a battery pack container included in the apparatus for cooling a power storage battery pack as shown in FIG. 1.

FIG. 2 shows the configuration and the coupling structure of the battery pack container 100 having an inner space in which one or more battery packs 10 are received.

As shown in FIG. 2, the battery pack container 100 of the present invention may include first and second side plates 110, 111, upper frames 130, lower frames 140 and a top plate 150.

The first side plate and the second side plate 110, 111 may be formed in a flat shape and face each other to form both side walls of the inner space where a battery pack 10 is received. The side plates 110, 111 are components which basically form the physical structure of the battery pack container 100 together with frames 130, 140, described later.

The lower frames 140 of the present invention consist of a rear lower frame 141 and a front lower frame 143, and these frames 141, 143 respectively connect the bottom corners of the first side plate 110 to those of the second side plate 111 to support the plates.

Meanwhile, the upper frames 130 of the present invention consist of a rear upper frame 131 and a front upper frame 133, and these frames 131, 133 respectively connect the top corners of the first side plate 110 to those of the second side plate 111 to support the plates.

In the lower frames 140, the front lower frame 143 which is forwardly disposed within the container has an inflow hole 145 which introduces a cooling medium for cooling a battery pack 10 by heat exchange.

The cooling medium introduced through the inflow hole 145 undergoes heat exchange with the battery pack 10, and thus, a temperature of the cooling medium increases. The cooling medium with an increased temperature moves up due to physical properties according to density distribution. Therefore, it is preferred to form the exhaust flow path of the cooling medium by reflecting this property effectively.

For this, first, the rear lower frame 141 of the lower frames 140, disposed rearwardly within the container, is configured without a hole, so that the cooling medium is not discharged, and the rear upper frame 131 of the upper frames 130, disposed rearwardly within the container, is configured with an outflow hole 135 for discharging the cooling medium after heat exchange occurs.

In order to improve the discharging efficiency of the cooling medium after heat exchange occurs and effectively form a common exhaust path for discharging the cooling medium as described later, it is preferred that the front upper frame 133 of the upper frames 130 be configured without a hole, like the above-mentioned rear lower frame 141.

Figure 3:
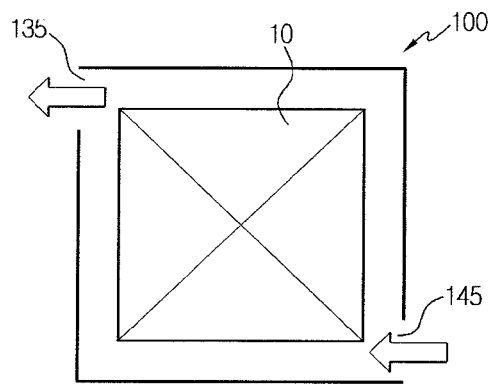
FIG. 3 is a schematic diagram showing the flow path of a cooling medium used in the battery pack container as shown in FIG. 2.

In the battery pack container 100 of the present invention having the above-mentioned structure, a cooling medium moves along a path as show in FIG. 3. That is, the cooling medium is introduced through the inflow hole 145 formed at the front lower frame 143, and is discharged through the outflow hole 135 formed at the rear upper frame 131 after heat exchange occurs.

Meanwhile, the battery pack container 100 of the present invention may further include the top plate 150, which is a component in a flat shape and covers the upper frames 130 and the top portions of the first and second side plates 110, 111. The top plate 150 divides the battery pack container 100 included in the stack 500 into each layer, so that the introduction and discharging of a cooling medium as described above, may be effectively made in each layer.

In this regard, the top plate 150 has an uneven structure 151 formed at the bottom portion thereof, in which the uneven structure 151 corresponds to an uneven structure formed at the top portion of the upper frames 130. These uneven structures may allow easy coupling and decoupling of the top plate 150 and the upper frames 130 and also may be closely fitted to each other to prevent a cooling medium from being dispersed or discharged in another direction.

The uneven structure may be formed to be engaged in an inserting fitting or a sliding manner. A concave or convex portion forming the uneven structure may be switched up and down and may be varied in terms of the shape, the position, and the number thereof.

Also, in order to effectively circulate a cooling medium or achieve good physical support, the container 100 may further include a bottom plate formed at the bottom thereof, or a rear side plate, formed on the rear surface thereof.

Furthermore, in order to effectively form the battery pack container 100 of the present invention in the stack 500 by layering the battery pack containers in a vertical direction, it is more preferred that the top of the top plate 150 of the battery pack container 100, corresponding to $N^{th}$ layer of the stack 500, be easily coupled to and decoupled from the bottom of the battery pack containers 100 (i.e., the bottom of the lower frames 140) corresponding to $N^{+1th}$ layer.

For this, it is preferred that the top plate 150 has an uneven structure formed at the top portion thereof, in which the uneven structure corresponds to an uneven structure formed at the bottom of the lower frames 140. By the coupling or decoupling of the uneven structure as described above, each battery pack container 100 may be easily layered in the form of a stack, and after coupling is made, the stack may effectively maintain the physical support in the vertical direction.

Figure 4:
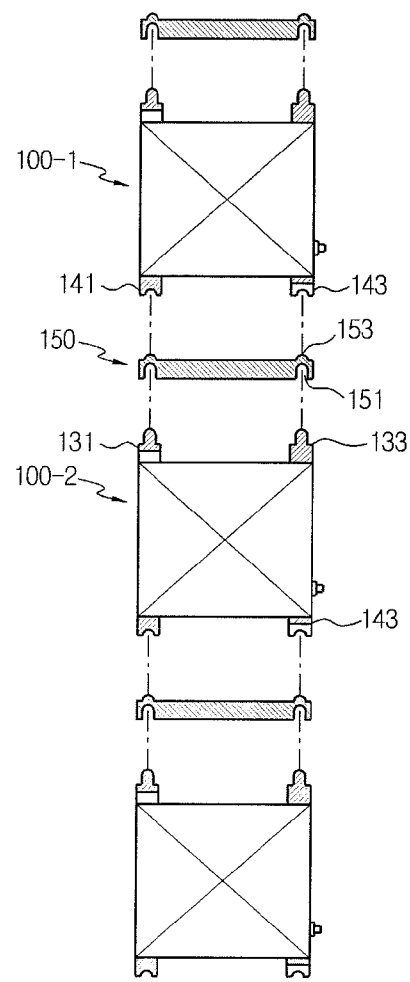
FIG. 4 is a view showing mutual coupling relationships between the top portion and the bottom portion of the battery pack container as shown in FIG. 2.
Figure 5:
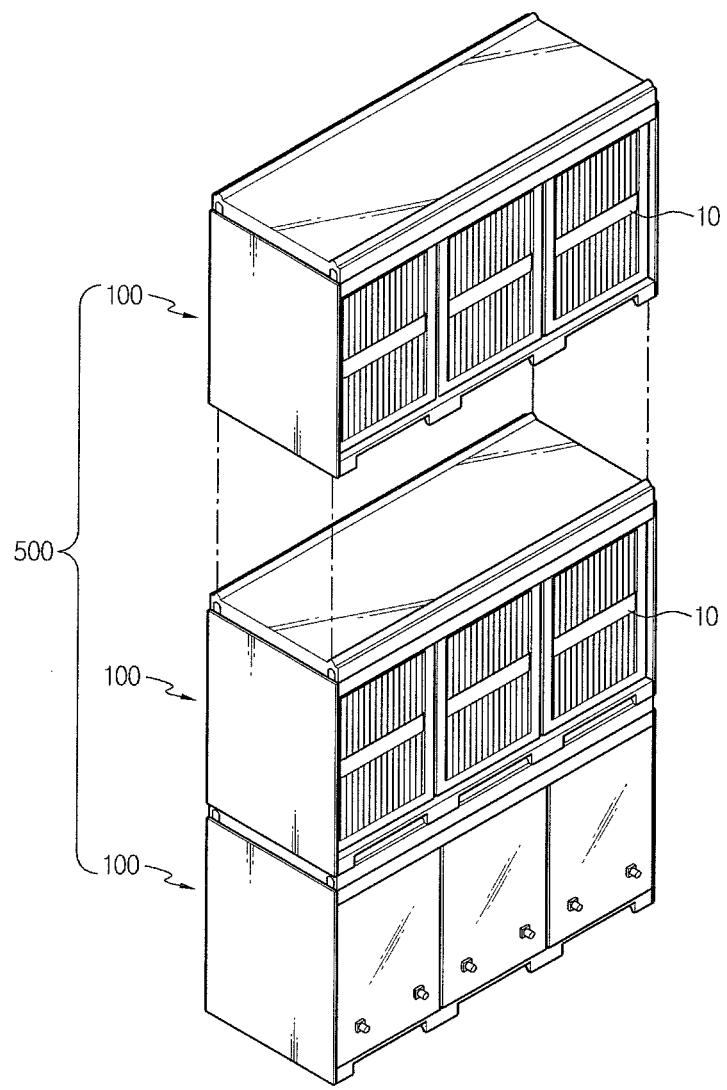
FIG. 5 is a perspective view showing a stack which is formed by coupling the battery pack containers as shown in FIG. 2.

That is, according to the present invention, the battery pack containers 100 are layered on the top of each other as shown in FIG. 4. The uneven structures of the lower frames 141, 143 included in a first battery pack container 100-1 is mutually coupled to the uneven structures 153 of the top portion of the top plate 150. The upper frames 131, 133 included in a second battery pack container 100-2 are coupled to the uneven structure 151 of the bottom portion of the top plate 150. Therefore, the battery pack containers 100 of the present invention are vertically layered to form the stack 500 as shown in FIG. 5.

Meanwhile, the first and second battery pack containers used herein just represent a logic unit for relatively dividing each configuration with each other, which may not be a component for separating the configuration in an absolute criterion, which is apparent to those of ordinary skill in the art.

Meanwhile, in the present invention, since the rear upper frame 131 delivers a downward force to the stack by physically coupling to the top plate 150 and has the outflow hole 135 for discharging a cooling medium after heat exchange, as described above, it is preferred that the rear upper frame 131 be formed in an arch shape.

Hereinafter, the housing 200 of the present invention and particularly, a front case 210 thereof will be explained with reference to FIGS. 6 and 7.

The front case 210 of the housing is placed on the front surface of the stack 500 and has one or more inlets 211 which introduce an external cooling medium for cooling a battery pack 10 into the cooling apparatus 1000 of the present invention.

The inlet 211 may be formed in various shapes and locations, and in order to effectively introduce an external cooling medium into the above-mentioned inflow hole 145 of the battery pack container 100, it is preferred that the inlet 211 of the front case 210 be provided at the location corresponding to the inflow hole 145 of the front lower frame 143.

Figure 6:
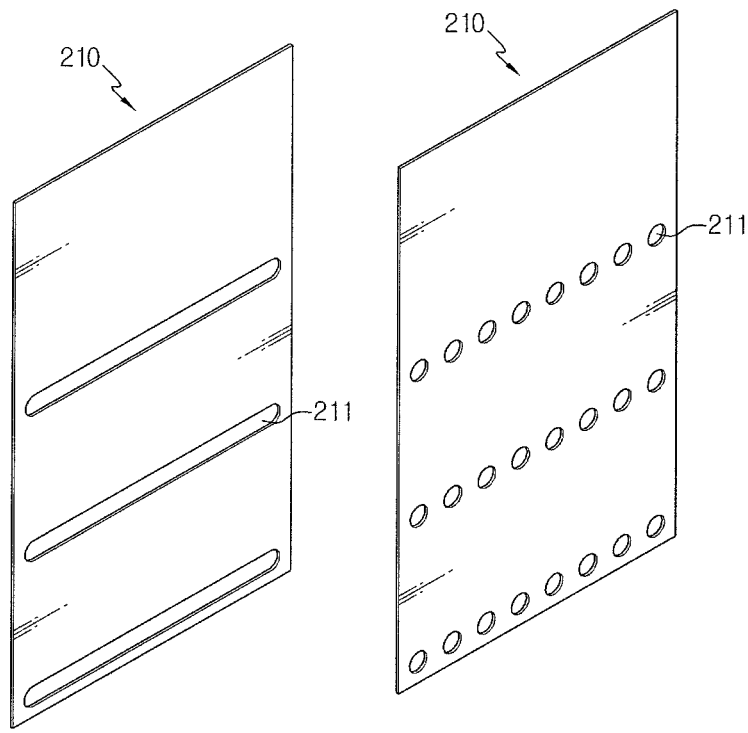
FIG. 6 is a view showing an embodiment of a front case of a housing included in the apparatus for cooling a power storage battery pack according to the present invention.
Figure 7:
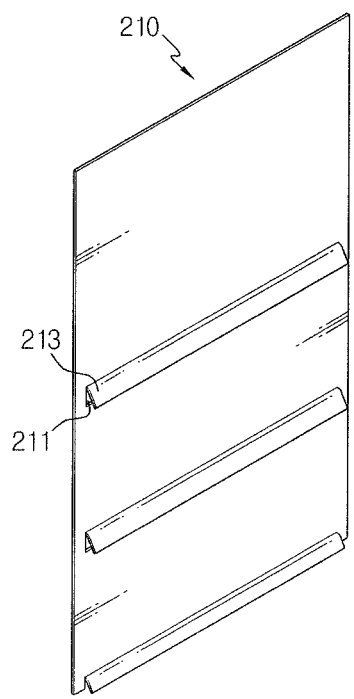
FIG. 7 is a view showing another embodiment of a front case of a housing included in the apparatus for cooling a power storage battery pack according to the present invention.

Also, as shown in FIG. 6, the inlet 211 may be formed in a plurality of holes or in a slit shape. However, since the above-mentioned inflow hole 145 of the front lower frames 143 may be formed with a plurality of holes arranged in a horizontal direction, it is preferred that the inlet 211 be formed in a slit shape to effectively introduce an external cooling medium.

In the present invention, the cooling apparatus 1000 is to cool a battery pack mounted or provided therein, and the battery pack 10 inherently has poor insulating properties due to the influence of water. Such a poor insulating property may cause the short circuit or swelling of a secondary battery, thereby leading to explosion. Therefore, in order to achieve safe and stable operation of the cooling apparatus 1000, it is more preferred that the cooling apparatus 1000 be configured so as not to be permeable to water from the outside.

The cooling apparatus 1000 of the present invention may be installed to be exposed to the outside depending on its installation circumstances. In this case, the cooling apparatus may be permeable to water depending on the weather conditions such as rain or snow.

In order to minimize the damages of the cooling apparatus caused by water or foreign substances from the outside, it is more preferred to form a protrusion member 213 capable of acting as eaves at the upper portion of the inlet 211 to protect the inlet 211.

The protrusion member 213 ensures the smooth introduction of a cooling medium and also minimizes the introduction of water under rainy or snowy weather conditions, thereby implementing a more effective apparatus.

Figure 8:
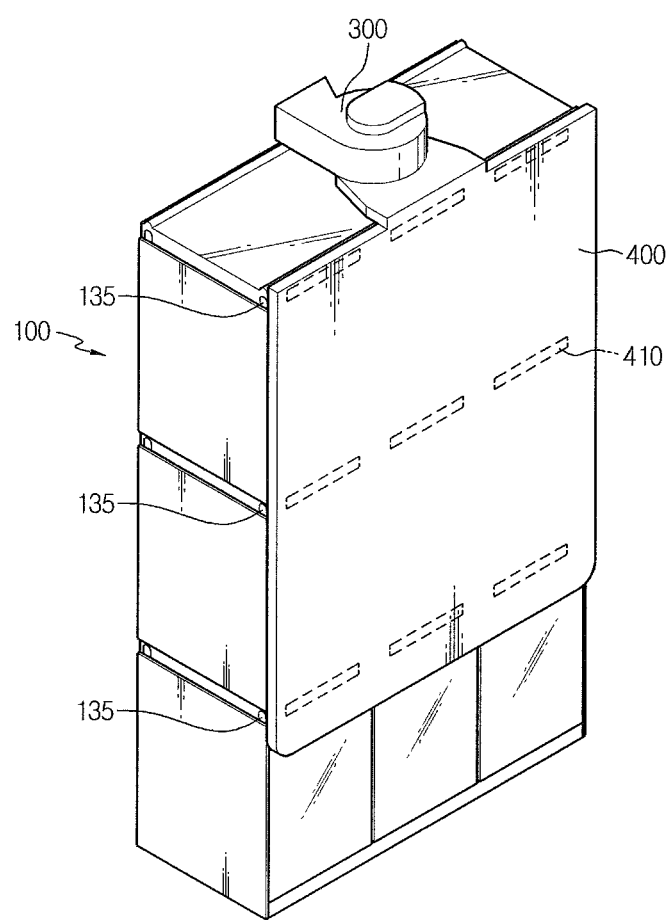
FIG. 8 is a perspective view showing an embodiment of an exhaust duct and a circulation driving module included in the apparatus for cooling a power storage battery pack according to the present invention.
Figure 9:
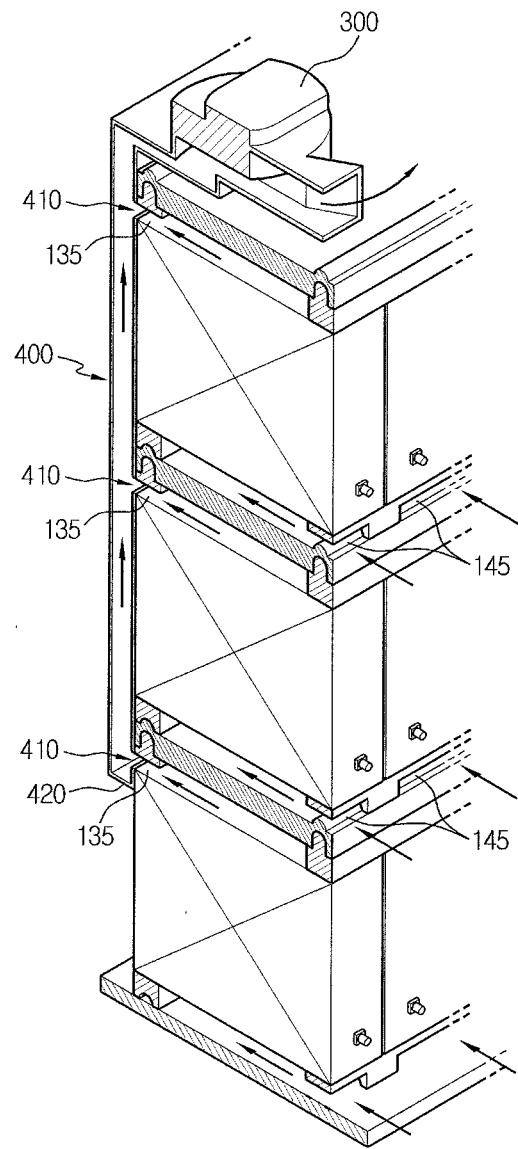
FIG. 9 is a view showing the coupling structure of an exhaust duct included in the apparatus for cooling a power storage battery pack according to the present invention.

FIGS. 8 and 9 show an embodiment of the exhaust duct 400 and the circulation driving module 300 consisting the cooling apparatus 1000 of the present invention, and FIG. 9 shows the coupling structures of the exhaust duct 400 included in the cooling apparatus of the present invention.

As described above, the circulation driving module 300 of the present invention provides a driving force which generates suction power to introduce or discharge an external cooling medium, such as air.

In order to effectively introduce an external cooling medium and exhaust the cooling medium after heat exchange occurs, it is more preferred that the circulation driving module 300 be placed at the top of the cooling apparatus 100 to more smoothly exhaust the cooling medium, such as air, etc., whose temperature is increased.

The exhaust duct 400 of the present invention is provided at the rear surface of the stack 500. One end of the exhaust duct 400 is coupled to the circulation driving module 300 to discharge the cooling medium after heat exchange occurs, and one or more outlets 410 are formed in the exhaust duct 400 to discharge the cooling medium after heat exchange occurs. Another end 420 of the duct is closed.

Also, in order to effectively discharge a cooling medium after heat exchange occurs, it is more preferred that the other end of the exhaust duct 400, connected to the circulation driving module 300 be formed to have a clogged structure.

Meanwhile, it is preferred that the outlet 410 of the exhaust duct 400 be provided at the corresponding location to the outflow hole 135, at which the rear upper frame 131 of the above-mentioned battery pack container 100 is formed, and the number of the outlet 410 be configured to correspond to the number of the battery pack containers included in the stack 500 (i.e., the number of the outflow holes 135) to improve the exhausting efficiency of a cooling medium.

According to such a structure, the exhaust duct 400 may form a common flow path for exhaustion, regardless of the number of the battery pack containers 100, so that an effective and integrated exhaust system may be obtained in a simple structure.

Figure 10:
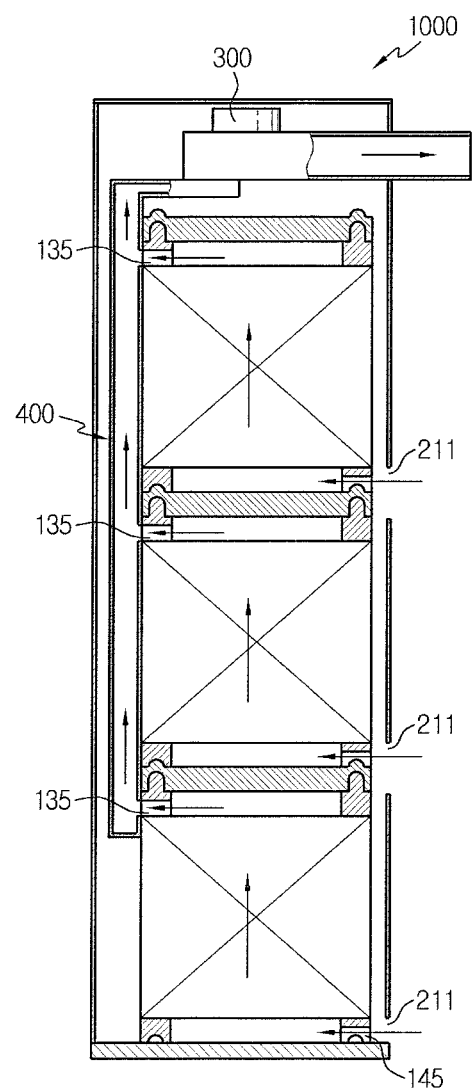
FIG. 10 is a view showing the overall circulation structure of the apparatus for cooling a power storage battery pack according to the present invention.

Based on the structure of the present invention as described above, a cooling medium moves along a path as shown in FIG. 10, and details will be described hereinafter.

First, an external cooling medium such as air is introduced through the inlet 211 and the inflow hole 145, formed at the front case of the housing 200 and at each battery pack container 100, respectively. The introduced cooling medium passes through the battery pack 10 and heat exchange occurs. The cooling medium which undergoes heat exchange is discharged to the outside through the outflow hole 135, the exhaust duct 400 and the circulation driving module 300, which are provided at each battery pack container 100. Thereby, the path of a cooling medium is formed.

INDUSTRIAL APPLICABILITY

The present invention has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, it should be understood that the terms 'top and bottom', 'front and rear', 'first' and 'second' used herein are a unit for relatively dividing each configuration with each other, which may not be a component for physically separating a certain order, priority or importance and separating the configuration in an absolute or physical criterion, which is apparent to those of ordinary skill in the art.

In addition, it should be understood that if the components of the present invention such as a frame, or the like are performed in an identical or corresponding function to the function described above, the number and location of the components of the present invention may be modified by those skilled in the art based on the function described above.

In other words, each component corresponds to an element distinguished for realizing the spirit of the present invention, so each component should be understood as being included in the scope of the present invention if it may perform its function though it is separately implemented or integrated with another component, and components realizing their same or similar function should be understood as being included in the scope of the present invention even though their designations are different.

What is claimed is:
1. An apparatus for cooling a power storage battery pack, comprising:
   a vertical stack having a plurality of battery pack containers, in a multi-layered structure, each battery pack container comprising:
   an inner space to receive a battery pack;
   a first side plate and a second side plate facing each other to form both side walls of the inner space;
   two lower frames for respectively connecting bottom corners of the first side plate to bottom corners of the second side plate, the two lower frames including a front lower frame, disposed forwardly within the container and having an inflow hole for introducing a cooling medium;
   two upper frames for respectively connecting top corners of the first side plate to top corners of the second side plate, the two upper frames include a rear upper frame, disposed rearwardly within the container and having an outflow hole for discharging the cooling medium after heat exchange occurs; and
   a top plate which covers the two upper frames and top portions of the first and second side plates, the top plate having an uneven structure at a bottom portion thereof corresponding to an uneven structure of a top portion of the upper frames, or the top plate has an uneven structure at a top portion thereof corresponding to an uneven structure of a bottom portion of the lower frames, the top plate spaced from a surface of the battery pack such that the cooling medium may pass through an area between the top plate and the battery pack;
   a housing having an inlet for introducing the cooling medium at the front case thereof;
   a circulation driving module for providing a driving force to introduce or discharge the cooling medium; and
   an exhaust duct provided at the rear side of the stack, and having an outlet for discharging the cooling medium after heat exchange occurs, the exhaust duct being connected to the circulation driving module at one end thereof,
   wherein the outlet of the exhaust duct is provided at the outflow hole formed at the rear upper frame,
   wherein the exhaust duct is installed in an inner space of the housing,
   wherein the exhaust duct extends from a lower layer of the stack to an upper layer of the stack, wherein the circulation driving module is connected to an upper end portion of the exhaust duct, and wherein a lower end portion of the exhaust duct has a closed structure.

2. The apparatus for cooling a power storage battery pack according to claim 1, wherein the inlet of the front case is provided at the place corresponding to the inflow hole formed at the front lower frame included in the battery pack container.

3. The apparatus for cooling a power storage battery pack according to claim 2, wherein the inlet of the front case is configured in a slit shape.

4. The apparatus for cooling a power storage battery pack according to claim 1, wherein protruding members are further provided at the upper portion of the inlet, so that foreign substances are not introduced into the inlet.

5. The apparatus for cooling a power storage battery pack according to claim 3, wherein the uneven structure is configured in an insert-type coupling structure or a slide-type coupling structure.

6. The apparatus for cooling a power storage battery pack according to claim 3, wherein the rear upper frame of the battery pack container is configured in an arch shape.

* * * * *